UNITED STATES PATENT OFFICE.

OTTO J. GRAUL, OF LUDWIGSHAFEN-ON-THE-RHINE, GERMANY, ASSIGNOR TO BADISCHE ANILIN AND SODA FABRIK, OF LUDWIGSHAFEN-ON-THE-RHINE, GERMANY, A CORPORATION OF GERMANY.

PROCESS OF MAKING CYAN-METHYL DERIVATIVES OF AROMATIC AMIDS.

SPECIFICATION forming part of Letters Patent No. 718,340, dated January 13, 1903.

Application filed January 28, 1902. Serial No. 91,635. (No specimens.)

*To all whom it may concern:*

Be it known that I, OTTO J. GRAUL, doctor of philosophy and chemist, a subject of the Duke of Anhalt, residing at Ludwigshafen-on-the-Rhine, in the Kingdom of Bavaria, Germany, have invented new and useful Improvements in Processes of Making Omega-Cyan-Methyl Derivatives of Aromatic Amido Substances, of which the following is a specification.

This invention relates to a new process for the production of omega-cyan-methyl derivatives of certain aromatic amins or substitution products of these latter.

By the action of formic aldehyde upon certain aromatic amins or aromatic amido substances the corresponding anhydro-formaldehyde-aromatic-amido substance is formed. Thus formic aldehyde and anilin yield anhydro-formaldehyde-anilin. These anhydro-formaldehyde-aromatic-amido substances when treated with an alkali bisulfite, such as sodium bisulfite, yield products which are termed, for instance, in the case of anilin, "anhydro-formaldehyde-anilin-sodium-bisulfite," (see Eibner, *Annalen der Chemie*, Vol. 316, page 126,) and generally they are hereinafter termed "anhydro-formaldehyde-aromatic-amido-substance-alkali-bisulfite." These compounds I will hereinafter for the sake of brevity designate also as "bisulfite" compounds. Now I have found that if certain such bisulfite compounds be acted upon by a salt of hydrocyanic acid, such as potassium cyanid or sodium cyanid, the above-mentioned omega-cyan-methyl derivatives are produced.

Among the aromatic amido substances which can be employed in carrying out this my invention are anilin, the toluidins, the xylidins, the naphthylamins, and anthranilic acid, (ortho-carboxy-anilin,) all of which substances I desire to have hereinafter included in the generic term "aromatic amido substance."

For the purposes of this invention it is immaterial how the bisulfite compound to be employed is prepared.

In the preferred embodiment of my process I operate as follows: I cause formic aldehyde to act upon, say, sodium bisulfite, and upon this product I cause, say, anilin to act, and upon the so-resulting product I cause, say, potassium cyanid to act. It is immaterial, however, in what order the three substances first mentioned—namely, formic aldehyde, the bisulfite, and the aromatic amido substance are brought together, and this order may be varied without affecting the nature of my invention.

I will further illustrate the nature of this my invention by means of the following examples, without, however, wishing to limit myself to the proportions or other conditions therein given. The parts are by weight, and the temperature degrees refer to the centigrade-scale.

EXAMPLE 1.

*Production of omega-cyan-methyl-anilin from anilin, formic aldehyde, sodium bisulfite, and potassium cyanid.*—Mix together three hundred parts of a solution of bisulfite of soda containing forty (40) per cent. of that substance ($NaHSO_3$) and eighty (80) parts of a commercial solution of formic aldehyde containing thirty-eight (38) per cent. of that aldehyde. To this add ninety-three (93) parts of anilin, stirring well the meanwhile and keeping the temperature at about fifty (50) degrees. In a short time the bisulfite compound of anhydro-formaldehyde-anilin will have been formed. Now add one hundred and fifty (150) parts of caustic-soda solution containing four (4) per cent. of caustic soda ($NaOH$) and pour it into a solution of seventy (70) parts of potassium cyanid in three hundred (300) parts of water, and heat this mixture in a water-bath to a temperature of from forty (40°) to fifty (50°) degrees. After having been maintained at the above temperature for about two (2) hours the mixture is transformed into a watery and an oil-like layer. This oil-like layer is the desired omega-cyan-methyl-anilin, which may be separated directly from the warm watery layer, or the whole may be allowed to cool, so that the oil-like layer solidifies, and the solidified portion may then be separated from the watery portion by filtration. The so-obtained omega-cyan-methyl-anilin is a practically pure product. I may also employ other aromatic amido substances in the place of the anilin of this Example 1; but then the working operations should be changed, as will readily be understood by chemists, so as to suit each individual case, as will be shown in the following examples.

EXAMPLE 2.

*A. Production of the bisulfite compound of anhydro-formaldehyde-anilin.*—Introduce one hundred and five (105) parts of powdered anhydro-formaldehyde-anilin into five hundred (500) parts of a solution of bisulfite of soda containing forty (40) per cent. of that substance, ($NaHSO_3$.) Heat this mixture by means of a water-bath to a temperature of from eighty (80°) to ninety (90°) degrees, stirring the meanwhile, until a clear solution is obtained. On cooling the liquor the bisulfite compound separates out in the form of white glistening leaflets.

*B. Production of omega-cyan-methyl-anilin from the product of Example 2 A.*—Introduce, while stirring, two hundred and nine (209) parts of the bisulfite compound resulting from the preceding Example 2 A into a solution of seventy (70) parts of potassium cyanid in one thousand (1,000) parts of water, and heat this mixture in the water-bath to a temperature of from forty (40°) to fifty (50°) degrees. After having been maintained at the above temperature for about two (2) hours the mixture is transformed into a watery and an oil-like layer. This oil-like layer is the desired omega-cyan-methyl-anilin, which may be separated directly from the warm watery layer, or the whole may be allowed to cool, so that the oil-like layer solidifies, and the solidified portion may then be separated from the watery layer by filtration. The so-obtained omega-cyan-methyl-anilin is a practically pure product.

EXAMPLE 3.

*Production of omega-cyan-methyl-anilin from anhydro-formaldehyde-anilin in one operation.*—Introduce one hundred and five (105) parts of anhydro-formaldehyde-anilin into five hundred (500) parts of a solution of bisulfite of soda containing forty (40) per cent. of that substance and heat the mixture, stirring the meanwhile, by means of a water-bath to a temperature of eighty (80°) degrees until complete solution is effected. Now filter off any suspended impurity and add five hundred (500) parts of water and three hundred and seventy (370) parts of a cold solution of caustic soda containing ten (10) per cent. of caustic soda, (NaOH.) Now cool the liquid to a temperature of fifty (50°) degrees and pour it into a solution of seventy (70) parts of potassium cyanid in three hundred (300) parts of water. The omega-cyan-methyl anilin separates out almost immediately from the clear solution as an oil-like layer and may be separated from the watery layer, as described in Example 1.

In place of the anhydro-formaldehyde-anilin corresponding amounts of other anhydro-formaldehyde-aromatic-amido substances may be employed—such as the anhydro-formaldehydes of the toluidins, xylidins, &c.—and the working operations should be changed, as will readily be understood by chemists, so as to best suit each individual case.

EXAMPLE 4.

*A. Production of a bisulfite compound from bisulfite of soda, alpha-naphthylamin, and formic aldehyde.*—Produce a paste by rubbing up one hundred and forty-five (145) parts of alpha-naphthylamin with fifteen hundred (1,500) parts of an aqueous solution of sulfurous acid containing three (3) per cent. of that acid. Now gradually introduce this paste into the result of mixing formic aldehyde and bisulfite of soda, (obtained as described in Example 1,) being careful to prevent the temperature of the mixture from rising above ten (10°) degrees by some means, such as external cooling. The bisulfite compound is formed almost immediately upon mixing.

In place of the above-described paste of naphthylamin I may also employ a concentrated alcoholic solution of naphthylamin.

*B. Production of omega-cyan-methyl-alpha-naphthylamin.*—Free the bisulfite compound arising from preceding Example 4 A from sulfurous acid and bisulfite of soda as far as practicable by washing with water. Convert it into a paste by rubbing it up with five hundred (500) parts of water, and to this paste add an aqueous solution of seventy (70) parts of potassium cyanid in three hundred (300) parts of water. Digest the whole on a boiling-water bath until the oil-like layer, which forms no longer, increases in volume. This oil-like layer is the desired omega-cyan-methyl-alpha-naphthylamin and solidifies on cooling. It may be collected in the same manner as is the omega-cyan-methyl-anilin of Example 1. The omega-cyan-methyl-alpha-naphthylamin so obtained is practically pure. If desired, it may be purified by recrystallization from a mixture of benzene and ligroin. When purified, it melts at about ninety-eight or ninety-nine (98° or 99°) degrees.

EXAMPLE 5.

*Production of omega-cyan-methyl-anthranilic acid.*—Dissolve one hundred and thirty-seven (137) parts of anthranilic acid in forty (40) parts of caustic soda dissolved in one thousand (1,000) parts of water. Cool this solution thoroughly by means of ice and gradually add to it seventy-nine (79) parts of formic aldehyde, (containing thirty-nine per cent. of the aldehyde,) taking care that the temperature does not rise above ten (10°) degrees. Now precipitate the anhydro compound by means of one hundred and fifty (150) parts of hydrochloric acid containing twenty-five (25) per cent. of hydrochloric acid, (HCl.) Convert the anhydro-formaldehyde-anthranilic acid so obtained into its bisulfite compound, as described in Example 2 A. Filter and press the bisulfite compound thus obtained from one hundred and thirty-seven (137) parts of anthranilic acid, and then rub it up to a paste with one thousand (1,000) parts of water and render the result neutral to litmus-paper by means of carbonate of soda or of bicarbonate of soda. Now gradually add to this clear neutral solution, while maintaining its temperature between forty (40°) and fifty (50°) degrees, a solution of seventy (70) parts of potassium cyanid in two hundred (200) parts of water. The reaction is soon completed. Precipitate the omega-cyan-methyl-anthranilic acid from the resulting solution by means of a sufficient quantity of hydrochloric acid of suitable strength. The product so obtained is practically pure and is identical with the product of United States Letters Patent No. 662,754, of November 27, 1900.

In place of the potassium cyanid of the preceding examples sodium cyanid may be employed.

What I claim is—

1. The described process of making omega-cyan-methyl derivative of an aromatic amido substance which consists in acting upon a hereinbefore-defined aromatic amido substance with formic aldehyde and an alkali bisulfite and then acting upon this product with a salt of hydrocyanic acid.

2. The described process of making omega-cyan-methyl derivative of an aromatic amido substance which consists in acting upon a hereinbefore-defined anhydro-formaldehyde-aromatic-amido substance with an alkali bisulfite and then acting upon this product with a salt of hydrocyanic acid.

3. The described process of making omega-cyan-methyl derivative of an aromatic amido substance which consists in acting upon a hereinbefore-defined anhydro-formaldehyde-aromatic-amido-substance-alkali bisulfite with a salt of hydrocyanic acid.

4. The described process of making omega-cyan-methyl-anilin which consists in acting upon anilin with formic aldehyde and sodium bisulfite and then acting upon this product with potassium cyanid.

5. The described process of making omega-cyan-methyl-anilin which consists in acting upon anhydro-formaldehyde-anilin with sodium bisulfite and then acting upon this product with potassium cyanid.

6. The described process of making omega-cyan-methyl-anilin which consists in acting upon anhydro-formaldehyde-anilin-sodium bisulfite with potassium cyanid.

In testimony whereof I have hereunto set my hand in the presence of two subscribing witnesses.

OTTO J. GRAUL.

Witnesses:
BERNHARD C. HESSE,
JACOB ADRIAN.

---

It is hereby certified that in Letters Patent No. 718,340, granted January 13, 1903, upon the application of Otto J. Graul, of Ludwigshafen-on-the-Rhine, Germany, for an improvement in "Process of Making Cyan-Methyl Derivatives of Aromatic Amids," errors appear in the printed specification requiring correction, as follows: In lines 32, 39, 46, 52, 57, and 62, page 3, the words "The described," commencing each claim, should be stricken out, and the following word "process" should commence with a capital P; and that the said Letters Patent should be read with this correction therein that the same may conform to the record of the case in the Patent Office.

Signed and sealed this 6th day of October, A. D., 1903.

[SEAL.]

F. I. ALLEN,
Commissioner of Patents.

It is hereby certified that in Letters Patent No. 718,340, granted January 13, 1903, upon the application of Otto J. Graul, of Ludwigshafen-on-the-Rhine, Germany, for an improvement in "Process of Making Cyan-Methyl Derivatives of Aromatic Amids," errors appear in the printed specification requiring correction, as follows: In lines 32, 39, 46, 52, 57, and 62, page 3, the words "The described," commencing each claim, should be stricken out, and the following word "process" should commence with a capital P; and that the said Letters Patent should be read with this correction therein that the same may conform to the record of the case in the Patent Office.

Signed and sealed this 6th day of October, A. D., 1903.

[SEAL.]

F. I. ALLEN,
*Commissioner of Patents.*